United States Patent [19]
Irion et al.

[11] 3,940,310
[45] Feb. 24, 1976

[54] NUCLEAR REACTOR

[75] Inventors: Leonhard Irion, Ruckersdorf; Walter Kollmar, Erlangen, both of Germany

[73] Assignee: Siemens Aktiengesellschaft, Munich, Germany

[22] Filed: Feb. 1, 1973

[21] Appl. No.: 328,674

[30] Foreign Application Priority Data
Feb. 2, 1972 Germany............................ 2204836

[52] U.S. Cl............................................. 176/36 R
[51] Int. Cl.²........................................... G21C 7/16
[58] Field of Search .................................. 176/36 R

[56] References Cited
UNITED STATES PATENTS

| | | | |
|---|---|---|---|
| 3,384,549 | 5/1968 | Deliege et al. | 176/36 R |
| 3,432,387 | 3/1969 | Jonsson | 176/36 R |
| 3,486,975 | 12/1969 | Ripley | 176/36 R |
| 3,527,670 | 9/1970 | Wimders | 176/36 R |
| 3,533,912 | 10/1970 | Dempsey | 176/36 R |
| 3,573,166 | 3/1971 | Germer | 176/36 R |
| 3,575,804 | 4/1971 | Ripley | 176/36 R |
| 3,607,629 | 9/1971 | Frisch | 176/36 R |
| 3,728,219 | 4/1973 | Mattern et al. | 176/36 R |
| 3,793,141 | 2/1974 | Ball | 176/36 R |

Primary Examiner—Harvey E. Behrend
Attorney, Agent, or Firm—Kenyon & Kenyon Reilly Carr & Chapin

[57] ABSTRACT

Coolant fluid within the nuclear reactor is fed under pressure to the lower end of the guide tubes. Control rods are disposed within the guide tubes and are movable hydraulically by means of the pressure transmitted from the lower end of the guide tubes. This pressure supports the control rods and tends to move them up, out of the guide tubes and out of the adjacent core. As a result of this arrangement, in event of malfunction or accident causing a loss of pressure, the control rods are not withdrawn from the guide tubes but, instead, are further inserted into the guide tubes and into the core.

6 Claims, 9 Drawing Figures

NUCLEAR REACTOR

BACKGROUND OF THE INVENTION

1. Field of the Invention

The field of this invention is nuclear reactors which use a coolant fluid under pressure, such as light water ($H_2O$).

2. Description of the Prior Art

U.S. Pat. No. 3,462,345 to Felix S. Jabsen discloses a nuclear reactor in which several fuel elements and individual control rods are provided in the reactor vessel. The individual control rods are longitudinally adjustable in the region of the fuel elements and are movable hydraulically in the guide tubes of the fuel elements, using the reactor coolant and a pump arranges outside the reactor vessel. For the purpose of moving the control rods hydraulically in the guide tubes, the pump generates suction or low pressure in a space provided at the cover of the reactor vessel by means of a suction line which leads from the lid of the reactor vessel to the pump. The pressure line is also connected to the lower part of the reactor vessel. The problem with this arrangement disclosed in the U.S. Pat. No. 3,462,345 is that if a break occurs in a suction line, this would cause a withdrawal of the control rods from the guide tubes, thereby jeopardizing the safety of the nuclear reactor.

SUMMARY OF THE INVENTION

The object of this invention is to provide an arrangement for the hydraulic operation of control rods within the reactor vessel such that withdrawal of the control rods is prevented in event of trouble, such as a break in the pressure line carrying the reactor coolant, thereby avoiding damage to the nuclear reactor.

The nuclear reactor of this invention uses a coolant fluid under pressure and comprises: a reactor pressure vessel; a core disposed within the reactor pressure vessel; one or more fuel elements disposed within the reactor vessel; one or more control rods disposed adjacent to the fuel elements within the reactor vessel; one or more guide tubes, each guide tube having a control rod disposed longitudinally therein, the control rods being movable hydraulically within the guide tubes; a pump disposed outside of the reactor vessel for maintaining the coolant fluid under pressure; and a pressure line carrying coolant fluid under pressure from the pump to the reactor vessel. The high pressure end of the pressure line is connected to the lower end of each guide tube, thereby generating high pressure at the lower end within the guide tube for operating the control rod within the guide tube to support the control rod and move the control rod out of the guide tubes and away from the core, with the result that in the event of a break in the pressure line and a loss of pressure, the control rods are inserted further into the guide tube.

Thus, the arrangement of this invention utilizes high pressure, rather than low or a suction pressure, to support the control rods.

A high pressure control valve is located outside the reactor vessel at a point accessible for maintenance and is used to control the control rods of the fuel elements. Several high pressure control valves may also be used to control the control rods within the reactor vessel so that not all control rods of the fuel elements are moved at the same time.

A flow control connector is brought through the lid of the reactor vessel in a pressure tight manner and a flexible connection is provided between the high pressure control valve and the flow control connector. If more than one high pressure control valve is used, the plurality of valves may be distributed on the outside periphery of the flow control connector so that a compact, space-saving design is achieved.

Inside the reactor vessel, the pressure line branches into a plurality of feed lines. These feed lines from several fuel elements lead into one flow control connector.

A guide adapter is used between the flow control connector and the guide tubes of the fuel element or elements, with a flexible connection between the guide adapter and the guide tubes. The purpose of this design is to compensate for manufacturing and installation tolerances and to avoid harmful forces in assembly. The feed lines are flexibly coupled to each other.

In order to obtain an indication of the position of the control rods within the guide tubes, the pressure exerted by the coolant being fed to the lower end of the guide tube is measured and then the pressure loss over the length of the upper guide tube is measured.

DETAILED DESCRIPTION

Figure 1:
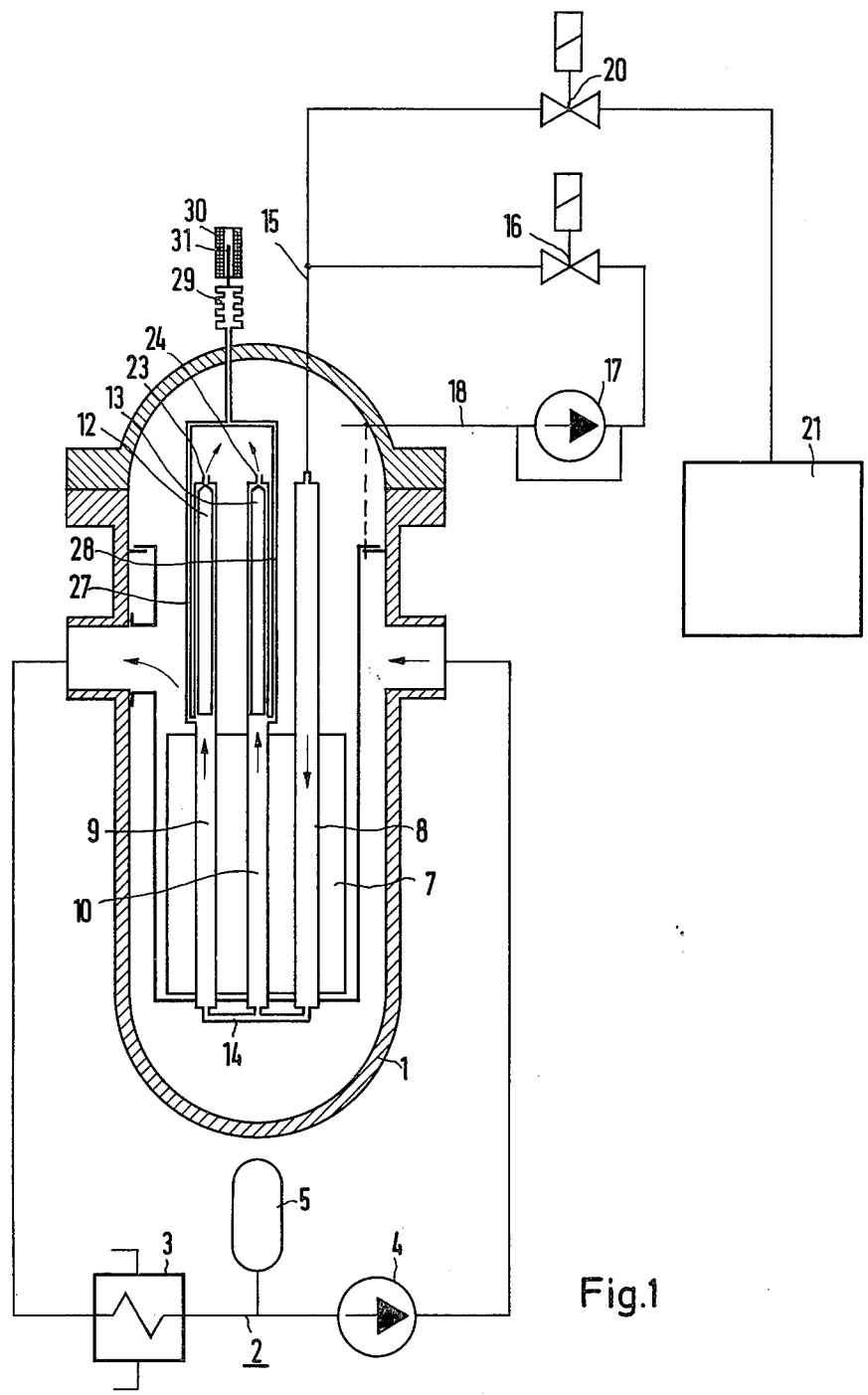
FIG. 1 is an overall illustration of the nuclear reactor of this invention, showing the reactor pressure vessel in partial longitudinal cross section and showing the coolant supply system schematically.

Referring to FIG. 1, the reactor pressure vessel is designated generally by the numeral 1 and is moderated by ordinary water, so-called "light water" ($H_2O$), as a coolant under pressure. The primary coolant circuit 2 for the reactor vessel 1 includes a heat exchanger 3, a main coolant pump 4 and a pressure stabilizer 5.

The core 7 in the reactor vessel 1 contains guide tubes 8, 9 and 10 which are located in the region of the fuel elements which are not shown in FIG. 1. Guide tubes 9 and 10 contain control rods 12 and 13, one control rod being disposed longitudinally within each guide tube. The lower end of guide tubes 9 and 10 are connected to guide tube 8 by means of ducts 14. Guide tube 8 is connected to a pressure line 15 carrying coolant fluid under pressure from outside the reactor vessel 1.

The pressure line 15 branches into two separate lines outside reactor vessel 1. One branch line is connected to high pressure control valve 16 and then to the high pressure side of a pump 17. The low pressure side of pump 17 is connected to a suction line 18 which, in turn, is connected to the reactor vessel 1. The second branch of pressure line 15 leads to low pressure control valve 20 and then to low pressure volume tank 21.

The upper end of guide tubes 9 and 10 are connected with the interior of the reactor vessel 1 by means of nozzleshaped constrictions 23 and 24. When high pressure control valve is open, the flow of coolant, as the result of the action of pump 17, is down through guide tube 8 as indicated by the arrow in guide tube 8, then through ducts 14 and up through guide tubes 9 and 10 as indicated by the arrows in guide tubes 9 and 10. This flow of coolant under pressure in guide tubes 9 and 10 supports control rods 12 and 13 in the upper region of guide tubes 9 and 10, that is, in the position of control rods 12 and 13 shown in FIG. 1.

The canals 27 and 28 shown in FIG. 1 are part of an apparatus which is designed to indicate the position of the control rods 12 and 13 within guide tubes 9 and 10. The canals 27 and 28 run parallel to the upper end position of the control rods 12 and 13. The canals 27 and 28 are connected with metal bellows 29 shown in FIG. 2. The metal bellows 29 are variable in length depending upon the pressure prevailing in the upper part of the guide tubes 9 and 10 shown in FIG. 1 and thereby indicate the position of the control rods 12 and 13 with guide tubes 9 and 10.

Returning to FIG. 1, the guide tubes 8, 9 and 10 comprise part of the pressure line carrying coolant fluid within reactor vessel 1. The pressure line carrying coolant fluid has a substantially U-shaped configuration in the area where it carries coolant to the lower end of guide tubes 8, 9 and 10. The pressure which is generated by means of pump 17 located outside the reactor vessel 1 is transmitted in the coolant to the lower end of guide tubes 9 and 10 and then to control rods 12 and 13. A high pressure control valve 16 located outside of the reactor vessel 1 and arranged in the pressure line 15 carrying coolant fluid controls the movement of the control rods 12 and 13. The control rods 12 and 13 are movable hydraulically within guide tubes 9 and 10 by means of the pressure generated by pump 17 which moves the control rods 12 and 13 out of guide tubes 9 and 10 and away from core 7.

In the event of an accident resulting in a break in the pressure line and a loss of pressure, the control rods 12 and 13 are inserted further into guide tubes 9 and 10 and thus into core 7. In the event of danger, such insertion of the control rods 12 and 13 can be accelerated by opening low pressure control valve 20, thereby switching into the pressure line a low pressure volume tank 21 for producing low pressure. A break in the suction line 18, which runs between the reactor vessel 1 and the pump 17, likewise, can only result in a release of pressure and, therefore, in the further insertion of the control rods 12 and 13 within guide tubes 9 and 10.

It has been found advantageous to arrange the control rods 12 and 13 symmetrically with respect to the fuel elements, and preferably with rotational symmetry with respect to the fuel elements, thereby facilitating the reaction of the fuel elements. The high pressure control valve 16 is responsive to increased pressure in pressure line 15 and the high pressure control valve 16 will close when the pressure line 15 becomes too high. After the pressure line 15 enters reactor vessel 1 it branches into a plurality of feed lines, not shown in FIG. 1, which will be explained in greater detail subsequently. Additional means may be disposed in the feed lines to open as a function of pressure. Such means include rupture discs and valves.

Figure 2:
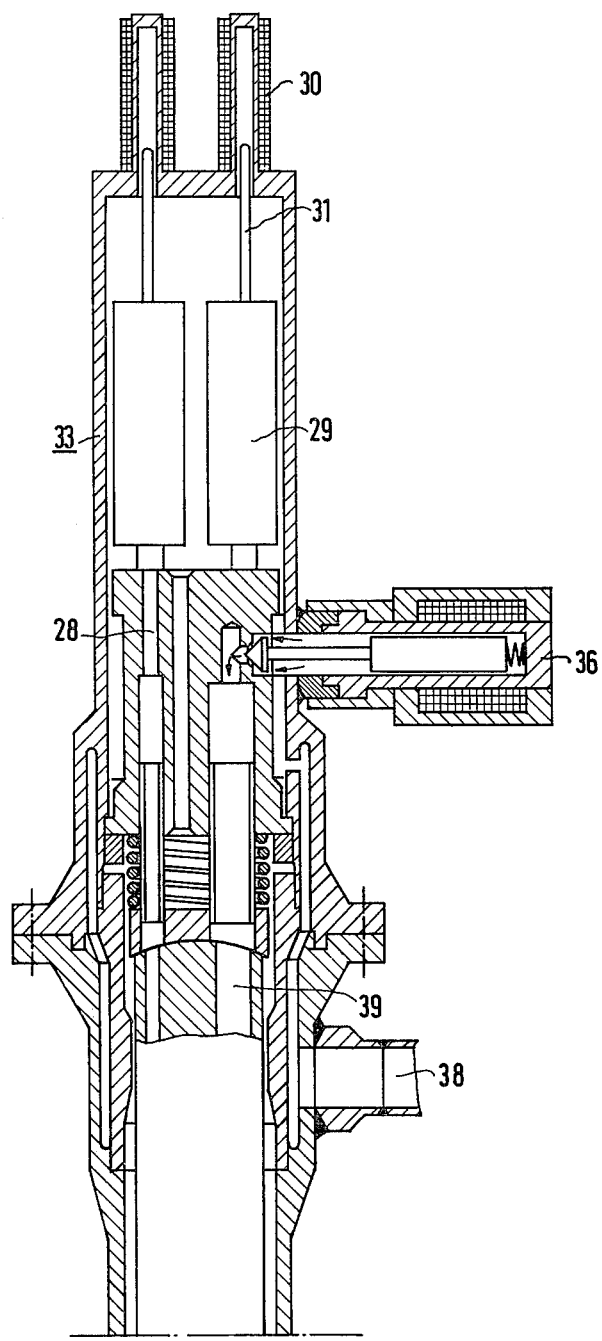
FIG. 2 is an enlarged longitudinal cross section of a flow control connector which is a component used with the reactor vessel shown in FIG. 1 at the point in FIG. 1 where the pressure line carrying the coolant is connected to the lid of the reactor pressure vessel.

Referring to FIG. 2, a flow control connector referred to generally by the numeral 33 is disposed outside of the reactor vessel 1 (shown in FIG. 1). The flow control connector 33 is connected to the pressure line 15 (shown in FIG. 1) carrying coolant fluid from pump 17 to the guide tubes 8, 9 and 10 (shown in FIG. 1) within reactor vessel 1 (shown in FIG. 1). The flow control connector 33 protrudes through the lid of the reactor vessel 1 (shown in FIG. 1). The flow control connector 33 is positioned in reference to the reactor vessel 1 at the point where pressure line 15 shown in FIG. 1 enters the reactor vessel 1. In the embodiment shown in FIG. 2, the flow control connector 33 has been designed for use with three control rods of three fuel elements. Other embodiments of the flow control connector may be designed for use with the control rods of a greater or lesser number of control rods and fuel elements. Since the flow control connector 33 has been designed for the control rods of three fuel elements, three magnetically operated valves 35, 36 and 37 have been arranged as a valve unit on the flow control connector 33 outside the lid of the reactor vessel 1.

The valves 35, 36 and 37 may be distributed uniformly around the circumference of the flow control connector 33 in one plane outside of the lid of reactor vessel 1. In the alternative the valves 35, 36 and 37 may be arranged in several planes. Also, the valves 35, 36 and 37 may be resiliently mounted on flow control connector 33. The magnetically operated valves, such as valve 36 shown in FIG. 2, control the flow of coolant from connections 38 which leads to pump 17 (shown in FIG. 1) to ducts 39 in the interior of flow control connector 33. The valve unit consisting of valves 35, 36 and 37 corresponds to high pressure control valve 16 shown in FIG. 1.

The valve unit, consisting of valves 35, 36 and 37, operates in conjunction with metal bellows 29 which are disposed in the flow control connector and are provided in triplicate. The metal bellows 29 in conjunction with cores 31 control the inductance of indicator coil 30. As previously explained in reference to FIG. 1, the metal bellows 29 shown in FIG. 2 are variable in length depending upon the pressure prevailing in the upper part of guide tubes 9 and 10 as shown in FIG. 1. Thus, the position of the metal bellows depends upon the pressure in canals 27 and 28 (shown in FIG. 1) and the change in length of metal bellows 29 is sensed electrically by means of an electrical sensing device, indicator coils 30, for sensing the change in length of the metal bellows 29 and for delivering an electrical signal responsive to the changes in length of metal bellows 29. As a result, indicator coils 30 indicate the position of control rods 12 and 13 within guide tubes 9 and 10 within the reactor vessel 1 (shown in FIG. 1).

Figure 3:
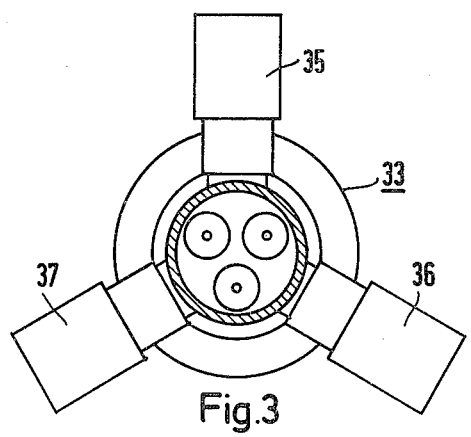
FIG. 3 is a top view showing a partial horizontal cross section of the flow control connector shown in FIG. 2.

Since the embodiments shown in FIGS. 2 and 3 are designed for three control rods of three fuel elements, a third canal has been provided for the third control rod, but this third canal and the third control rod are not shown in the drawings.

Figure 4:
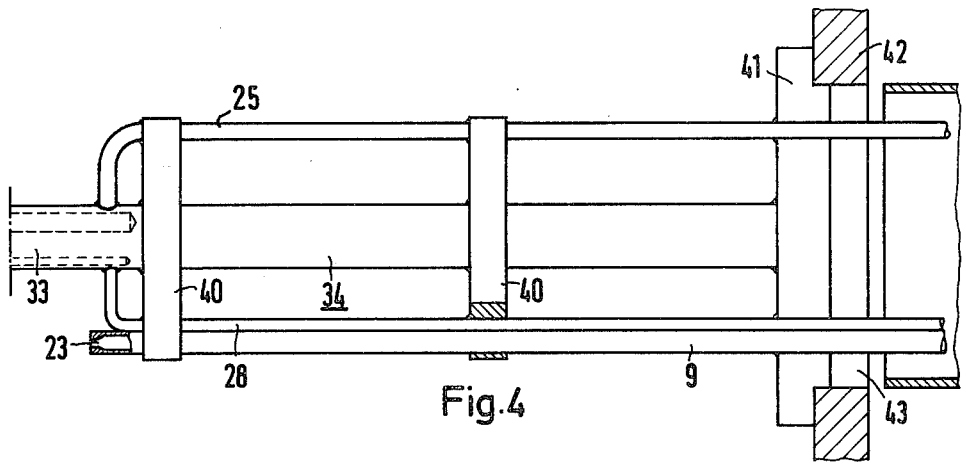
FIG. 4 is an illustration of a guide adapter and other components disposed within the reactor vessel shown in FIG. 1 adjacent to the flow control connector shown in FIG. 2.
Figure 8:
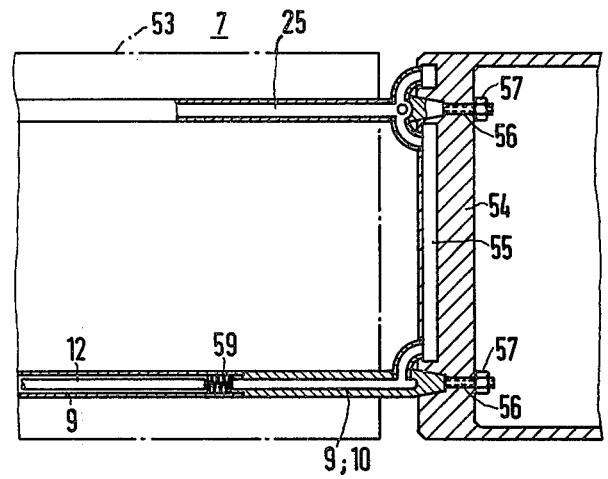
FIG. 8 is an illustration of components within the reactor pressure vessel shown in FIG. 1 showing the connection of a feed line to a guide tube.

Referring to FIG. 4, a guide adapter 34 is disposed within the reactor vessel (shown in FIG. 1) and above the fuel elements. Feed line 25 shown in FIG. 4 represents one of the feed lines which have branched off from pressure line 15 (shown in FIG. 1) after the pressure line 15 has entered reactor vessel 1. Referring to FIG. 4, feed line 25 is connected to guide tube 9, provided for control rod 12 (shown in FIG. 1) by cross pieces 40 and mounting flange 41. Mounting flange 41 closes off openings 43 which are provided for the guide adapter 34 in cover plate 42 positioned above core 7 (shown in FIG. 1). The canal 28, which is used for providing an indication as to the position of the control rod 12 within guide tube 9, runs next to guide tube 9 with opening 23 at the upper end of guide tube 9. Feed line 25 in guide adapter 34 is connected to a feed line in the fuel element (not shown). There are the same number of feed lines in the guide adapter 34 and in the fuel element 53 (FIG. 8). The feed lines from several fuel elements, after passing through guide adapters 34, lead into one flow control connector 33 (FIG. 2) and from there into pressure line 15 (FIG. 1).

Figure 5:
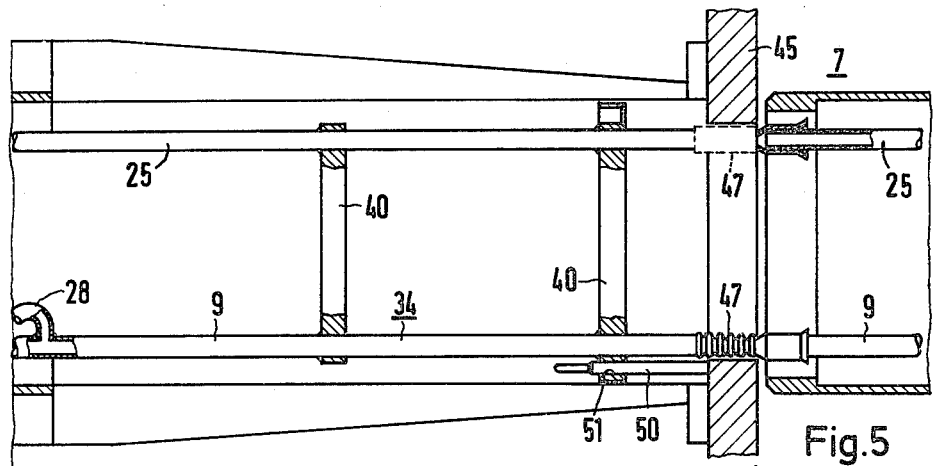
FIG. 5 is an illustration of the coupling of the guide adapter shown in FIG. 4 to the guide tube in the core.
Figure 6:
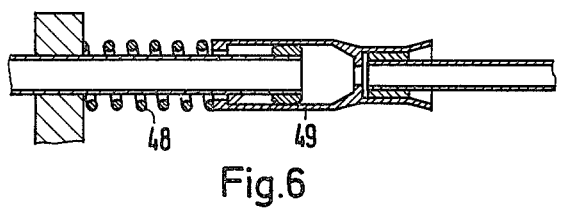
FIG. 6 is an illustration of an alternate embodiment of the coupling shown in FIG. 5.

FIG. 5 shows the coupling of the guide adapter 34 to the guide tubes 8 and 9 of the fuel elements in the core 7. The space above the grid plate 45 denotes the upper limit of the fuel elements. Metal bellows 47 provide a flexible coupling in all directions. Instead of the metal bellows 47 shown in FIG. 5, the fitting 49 loaded by a spring 48, shown in FIG. 6, may be used. Returning to FIG. 5, guide pin 50 and hole 51 in cross piece 40 insure an aligned lateral positioning of the feed lines 25 that are to be connected to each other.

Figure 7:
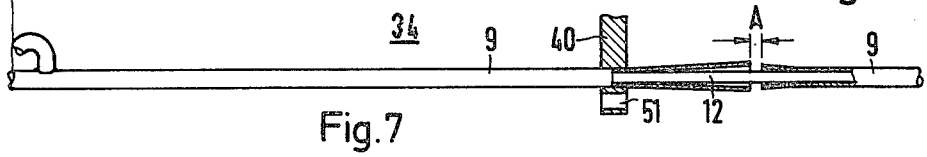
FIG. 7 is an illustration of another alternate embodiment of the coupling shown in FIG. 5.

FIG. 7 illustrates an alternate embodiment relating to the coupling between the guide adapter 34 and guide tube 9 which has control rod 12. The predetermined spacing, indicated by the letter A, is provided at the joint between guide adapter 34 and guide tube 9 containing control rod 12. This spacing A provides tolerance for thermal expansion. However, the flow in guide tube 9 is influenced by this arrangement and, as a result, a different kind of position indication is necessary.

Referring to FIG. 8, base plate 54 of fuel element 53, which is indicated by dash-dot lines, is used to form duct 55 and connection openings which connect the feed line 25 with guide tube 9 in a U-shaped configuration. The guide tubes 8 and 9 are fastened to base plate 54 by screws 56 and nuts 57. Spring 59 prevents shock to control rod 12 when it reaches the lower end position of guide tube 9.

Although not clearly visible in the drawings, the cross sections of the feed lines 25, particularly in the region of valves 35, 36 and 37, are smaller than the clearance between the control rods 12 and 13 and the guide tubes 9 and 10 which surround the control rods. The cross section ratio is preferably 1:2 to 1:5. If, in spite of this, excessive pressure should develop, such as through evaporation of the coolant, the elastic couplings shown in FIGS. 5 and 6 will open. In addition, as already mentioned, special rupture discs or other means can also be provided. Thus, in event of malfunction or accident, the upwardly directed pressure force acting upon the control rods is smaller than the weight of the control rods.

Figure 9:
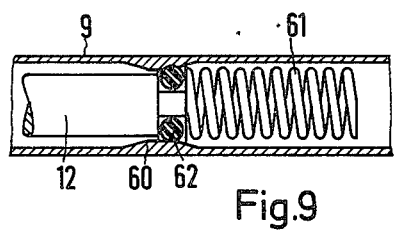
FIG. 9 is an illustration of components within a guide tube shown in FIG. 1.

Referring to FIG. 9, a sealing ring 62, which is at least radially resilient, is disposed at the lower end of the control rod within guide tube 9. A spring 61 is disposed beneath the sealing ring 62 within guide tube 9. The reference to the lower end of the control rod 12 refers to the end of the control rod 12 nearer the core 7. When the control rod 12 reaches its upper position, the sealing ring 62 is at a constriction within guide tube 9. The result is that the flow of coolant under pressure is largely shut off.

What is claimed is:

1. A pressurized-water reactor comprising a reactor pressure vessel having an inside with an upper portion and a lower portion, said portions containing pressurized-water core coolant, a nuclear core in said lower portion, said core comprising fuel element and at least three substantially vertical control rod guide tubes therein, said guide tubes having top and bottom ends, a duct interconnecting said bottom ends, a guide tube adaptor positioned in said upper portion of said vessel and above said core, said adaptor comprising a substantially vertically high-pressure feed line tube having a bottom end releasably connecting with said top end of a first one of said guide tubes, said adapter also including a substantially vertical guide tube extension for each of said other guide tubes, each said guide tube extension having a bottom end registered with a top end of a respective one of said other guide tubes, said extensions each having a top end having a passage for said coolant, and which is open to said vessel's said upper portion, a control rod reciprocative in each of said other guide tubes and their respective guide tube extensions, said first one of said guide tubes being void of any control rod said feed line tube having a top end, and means for controllably removing a portion of said coolant from said vessel and increasing the removed coolant's pressure and returning the coolant to said top end of said high-pressure feed line.

2. The reactor of claim 1 in which said duct interconnecting said bottom ends of said guide tubes, is formed in a base plate to which the just-named bottom ends are connected.

3. The reactor of claim 1 in which said guide tube forms a space around said control rod and at least a portion of said high-pressure feed line tube has a cross sectional area less than the cross sectional area of said space.

4. The reactor of claim 1 in which said means comprises a pump, a suction line connecting said pump with said vessel, and a high pressure line having a pressure-responsive valve means and connecting said pump through conduit means with said top end of said adaptor's said high pressure feed line, said valve means closing in response to a pressure increase.

5. The reactor of claim 1 having a flexible coupling connecting said bottom end of each of said guide tube extensions with a respective top end of other second one of said guide tubes.

6. The reactor of claim 1 in which said guide tube extensions and their respective guide tubes have their respective registered said bottom and said top ends, separated by a space providing tolerance for thermal movements of said guide tube extension and said guide tube.

* * * * *

UNITED STATES PATENT AND TRADEMARK OFFICE
CERTIFICATE OF CORRECTION

PATENT NO. : 3,940,310

DATED : February 24, 1976

INVENTOR(S) : Leonhard Irion et al

It is certified that error appears in the above-identified patent and that said Letters Patent are hereby corrected as shown below:

In Column 1, line 16-17, change "arranges" to --arranged--

In Column 3, line 14, after the words "control valve" add --16--

In claim 1, column 6, line 22, the word "vertically" should be --vertical--

In claim 1, column 6, line 34, after the words "top end" insert --terminating inside said pressure vessel--

In claim 5, column 6, line 57, after the word "of" insert the word --said--

In claim 5, column 6, line 57-58, delete the words "second one".

Signed and Sealed this eleventh Day of May 1976

[SEAL]

Attest:

RUTH C. MASON
Attesting Officer

C. MARSHALL DANN
Commissioner of Patents and Trademarks